United States Patent [19]

Meier et al.

[11] Patent Number: 5,286,285

[45] Date of Patent: Feb. 15, 1994

[54] FINELY POWDERY MAGNESIUM HYDROXIDE AND A PROCESS FOR PREPARING THEREOF

[75] Inventors: Andreas Meier; Michael Grill, both of Leoben, Austria

[73] Assignee: Veitscher Magnesitwerke-Actien-Gesellschaft, Vienna, Austria

[21] Appl. No.: 71,615

[22] PCT Filed: May 2, 1990

[86] PCT No.: PCT/AT90/00043

§ 371 Date: Mar. 4, 1991

§ 102(e) Date: Mar. 4, 1991

[87] PCT Pub. No.: WO90/13516

PCT Pub. Date: Nov. 15, 1990

Related U.S. Application Data

[63] Continuation of Ser. No. 613,809, Mar. 4, 1991, abandoned.

[30] Foreign Application Priority Data

May 5, 1989 [AT] Austria ................... 1073/89

[51] Int. Cl.$^5$ ........................... C09D 5/16; C09D 5/18
[52] U.S. Cl. ........................... 106/18.26; 106/18.11; 106/461; 252/601; 252/609; 423/161; 423/164; 423/331; 423/583
[58] Field of Search ........... 106/18.11, 18.26, 461; 252/601, 609; 423/160, 164, 161, 155, 158, 583, 331

[56] References Cited

U.S. PATENT DOCUMENTS

| | | | |
|---|---|---|---|
| 3,836,627 | 9/1974 | Wiensz et al. | 423/169 |
| 3,980,753 | 9/1976 | Grill et al. | 423/161 |
| 4,255,399 | 3/1981 | Grill et al. | 423/164 |
| 4,671,896 | 6/1987 | Hasegawa et al. | 252/609 |
| 4,695,445 | 9/1987 | Nakaya et al. | 423/635 |
| 4,944,928 | 7/1990 | Grill et al. | 423/161 |

FOREIGN PATENT DOCUMENTS

| | | | |
|---|---|---|---|
| 356630 | 5/1980 | Austria | C01F 5/02 |
| 1093277 | 1/1981 | Canada | C01F 5/30 |
| 297088 | 12/1988 | European Pat. Off. | C01F 5/00 |
| 3323050 | 1/1984 | Fed. Rep. of Germany | C01F 5/10 |

OTHER PUBLICATIONS

Chemical Abstracts, vol. 96, No. 14, Apr. 1982, 106605y.
Chemical Abstracts; vol. 68, No. 4 Jan. 1968; 14571c.
Encyclopedia of Chemical Technology, Third Edition, vol. 14, Magnesium Compounds, p. 632 (date unknown).

Primary Examiner—Mark L. Bell
Assistant Examiner—Michael Marcheschi
Attorney, Agent, or Firm—Sughrue, Mion, Zinn, Macpeak & Seas

[57] ABSTRACT

A finely powdery magnesium hydroxide especially suitable as a flame-retardant filler for plastic compounds, in which the particles are provided optionally with a thin coating of a surfactant. The grain size of the magnesium hydroxide, measured by laser diffraction, is below 10 μm. The median value of the grain size is greater than 0.8 μm, and the maximum of the median value of the grain size is 3 μm. The contents of water-soluble ionic impurities, viz. $Ca^{++}$, $Na^+$, $K^+$, $SO_4^{--}$, $Cl^-$, of the magnesium hydroxide are below the following limits (in parts by weight): $Ca^{++}<1000$ ppm, $Na^+<20$ ppm, $K^+<20$ ppm, $SO_4^{--}<1500$ ppm, $Cl^-<1000$ ppm. The contents of Mn, Cu and Ni are below the following limits (in parts by weight): $MnO<100$ ppm, $NiO<100$ ppm, $CuO<10$ ppm. The process for preparing the magnesium hyroxide of this invention starts with a magnesium oxide obtained by spray roasting a magnesium chloride solution from which previously foreign matter has been removed, adding water thereto for hydration, whereupon the resulting magnesium hydroxide is removed by filtration and the filter cake material is subjected to a post-wash with water.

22 Claims, No Drawings

FINELY POWDERY MAGNESIUM HYDROXIDE AND A PROCESS FOR PREPARING THEREOF

This is a continuation of application Ser. No. 07/613,809 filed Mar. 4, 1991 now abandoned.

The present invention relates to a finely powdery magnesium hydroxide suitable especially as flame-retardant filler for plastic compounds, the particles thereof being provided optionally with a thin coating of a surfactant.

Frequently, finely powdery magnesium hydroxide is used as flame-retardant filler for plastic compounds, especially those on basis of thermoplastic materials. In such a use relatively high amounts of magnesium hydroxide are added to the plastics, the weight of the magnesium hydroxide frequently amounting to the half up to the double weight of the plastic. Kinds of finely powdery magnesium hydroxide often have properties which exert a negative influence on the mechanical properties of plastic compounds to which such a magnesium hydroxide has been added as filler. Often e.g. a tendency of such plastic compounds and articles produced from such plastic compounds respectively to take up relatively high amounts of water, to a decrease of the tensile strength and to an increased ageing may be observed.

Frequently, the flowability and formability of such plastic compounds and the appearance of the surface of articles formed from such plastic compounds is adversely influenced by the properties of certain kinds of finely powdery magnesium hydroxide, e.g. by the grain structure and the contents of water thereof.

DE-C3-2 624 065 describes a magnesium hydroxide having the special structure of particles which should eliminate in use of said magnesium hydroxide in plastic compounds disadvantages as mentioned above. The particles should have a deformation in the <101>-direction of not more than $3 \times 10^{-3}$, a crystallite size in the <101>-direction of more than 800 Å and a specific surface, determined according to BET, of less than 20 m$^2$/g. According to DE-C3-2 659 933 in addition to that structure of the particles of the magnesium hydroxide said particles are covered with anionic surfactants so as to eliminate the above mentioned disadvantages.

Now it has been found that the above mentioned structural parameters are not suitable for the characterization of a magnesium hydroxide to be used for the above mentioned purpose, by which the above mentioned disadvantages can be eliminated reliably. Despite of such a structure in the practice, the mentioned disadvantages may occur.

It is an object of the present invention to provide a finely powdery magnesium hydroxide as defined above, which in use as flame-retardant filler in plastic compounds eliminates reliably the mentioned disadvantages and which, also after a longer period of time, does not induce both any impairment of the chemical-physical properties, especially of the electrical insulating property and of the chemical resistance, and any impairment of the mechanical properties and of the dimensional stability and does not favor disadvantageous changes of the plastic compounds under the influence of moisture and other environmental influences. The finely powdery magnesium hydroxide to be prepared should allow also a simple processing of plastic compounds, in which it serves as flame-retardant filler, and should allow to obtain good strength properties of articles prepared from such plastic compounds as well as a uniformly closed surface of said articles, which does not show any trouble by surface faults.

The finely powdery magnesium hydroxide of the present invention is characterized by a grain size, measured by laser diffraction, of below 10 μm, the median value of the grain size being greater than 0.8 μm and 3 μm at the utmost and further characterized in, that the magnesium hydroxide contains water-soluble ionic impurities, viz. $Ca^{++}$, $Na^+$, $K^+$, $SO_4^{--}$, $Cl^-$, in amounts below the following limits (in parts by weight):

$Ca^{++} < 1000$ ppm, $Na^+ < 20$ ppm, $K^+ < 20$ ppm, $SO_4^{--} < 1500$ ppm, $Cl^- < 1000$ ppm, and that the magnesium hydroxide contains Mn, Cu and Ni in amounts below the following limits (in parts by weight):

$MnO < 100$ ppm, $NiO < 100$ ppm, $CuO < 10$ ppm.

Magnesium hydroxide having such features allows to achieve well the above mentioned objects.

In experiments carried out during the development of subject matter of this invention is was found that by keeping the values of water-soluble ionic impurities of the magnesium hydroxide in the mentioned ranges the insulating resistance and the electrical breakdown resistance of bodies or articles consisting of a plastic compound filled with such a magnesium hydroxide are definitely higher than in case of using other usual kinds of magnesium hydroxide, which fact is particularly observed, if such bodies or articles are exposed to the influence of moisture. Furthermore by keeping the amounts of water-soluble ionic impurities of the magnesium hydroxide in the mentioned ranges the swelling of plastic compounds occurring under the influence of moisture, which swelling was observed often with use of usual kinds of magnesium hydroxide, is prevented effectively, and by using of the magnesium hydroxide of the invention very good mechanical properties (e.g. strength, elongation at break and dimensional stability) of the articles produced from the plastic compounds as well as a good resistance thereof against phenomena of ageing are achieved. Keeping the amounts of contaminations by heavy metals within the mentioned ranges contributes to these features, which fact probably can be explained that thereby a chemically disadvantageous influence on the plastic material (e.g. oxidative degradation) is substantially eliminated. Observing the above mentioned upper limit of the grain size contributes to the good mechanical properties and the large avoidance of disadvantageous effects of extraneous influences, especially of moisture, by allowing to achieve a high surface quality of the bodies or articles produced from the plastic compounds, that means a dense and closed surface counteracting to the penetration of foreign matter. Equally, the mentioned grain size is advantageous for obtaining a good tensile strength. Also the observation of the above mentioned range of the median value (designated "$d_{50}$") of the grain size of the magnesium hydroxide is advantageous for the achievment of favorable mechanical properties of the plastic compounds and also with respect to the flame-retardant effect. It should be mentioned that the stated values of grain sizes are based on a measurement of the grain size with laser diffraction. A measurement of the grain size by other measuring methods may give other values. The measurement with laser diffraction does not detect an amount of up to 1% (by weight) of oversized particles.

Therefore, it appears to be particularly advantageous that bodies or articles produced from plastic compounds containing the magnesium hydroxide of the invention as a filler show several favorable mechanical properties in combination. Thus, e.g. very good values of tensile strength und simultaneously good values of elongation at break may be obtained in elastomeric plastic compounds.

A preferred embodiment of the magnesium hydroxide of the invention for obtaining a particularly good resistance to influences of moisture provides that the amount of $Ca^{++}$, $Na^+$, $SO_4^{--}$, $Cl^-$ is below the following limits:

$Ca^{++} < 500$ ppm, $Na^+ < 10$ ppm $K^+ > 10$ ppm, $SO_4^{--} < 800$ ppm, $Cl^- < 500$ ppm.

As to the contents of heavy metals in the magnesium hydroxide a preferred embodiment provides that the amount of Mn, Cu and Ni is below the following limits: $MnO < 50$ ppm, $NiO < 50$ ppm, $CuO < 5$ ppm. Thereby the catalytic promotion of phenomena of degradation of the plastic material can be eliminated substantially completely.

As to the flame-retardant effect of the finely powdery magnesium hydroxide it is also advantageous if the loss at red heat of the magnesium hydroxide is >30.0%.

The electrical conductivity of the magnesium hydroxide, determined according to DIN 53208 on an aqueous suspension, is preferably $<500$ $\mu S/cm$, preferably $<300$ $\mu S/cm$.

For obtaining favorable mechanical properties of the plastic compounds and the articles produced therefrom and also for achieving the flame-retardant effect of the magnesium hydroxide a maximum value of the grain size of 7 $\mu m$ and a median value of the grain size of $1 \pm 0.2$ $\mu m$ proved to be especially advantageous.

As to the processing the magnesium hydroxide with the plastic material to give a plastic compound and as to the dispersion of the magnesium hydroxide in the plastic material and also as to an influence on the E-modul of the plastic compounds filled with the magnesium hydroxide it is advantageous if the ratio of the diameter of the primary particles of the magnesium hydroxide to the height of said primary particles, designated "aspect ratio", is between 2 and 6. A ratio of the diameter of said primary particles to the height thereof of between 3 and 4 is particularly favorable for the dispersibility.

The optional provision of a thin coating of a surfactant on the particles of the magnesium hydroxide is mainly advantagous for a further improvement of the dispersibility and for a further improvement of the mechanical properties of the plastic compounds. Relatively small amounts of up to 2%, related to the weight of the magnesium hydroxide, may be sufficient.

The present invention also relates to a process for preparing the finely powdery magnesium hydroxide, said process comprising adding water to magnesium oxide obtained by spray roasting from a magnesium chloride solution from which previously foreign matter has been removed, which magnesium oxide contains $Ca^{++}$, $Na^+$, $K^+$, $SO^{--}$, $Cl^-$, in amounts below the following limits (in parts by weight):

$Ca^{++} < 10 000$ ppm, $Na^+ < 1000$ ppm, $K^+ < 1000$ ppm, $SO_4^{--} < 3000$ ppm, $Cl^- < 100 000$ ppm, and Mn, Cu and Ni in amounts below the following limits (in parts by weight): $MnO < 150$ ppm, $NiO < 150$ ppm, $CuO < 15$ ppm, allowing to react the suspension with stirring, removing then the magnesium hydroxide formed in suspension by filtration and subjecting the filter cake material to one or several post-washes with completely desalted water, dewatering the filter cake material again and finally drying thereof. Preferably completely desalted water is used for the hydration of the magnesium oxide.

In the process of the invention the suspension preferably is allowed to react with stirring at a temperature of between 55° to 100° C. For a rapid and complete progress of the hydration and for obtaining the features essential for the magnesium oxide of the invention it is advantageous to stir the suspension stirring at a temperature of between 80° and 90° C.

In the scope of the process of the invention it is possible in a particularly simple way to achieve the special properties and features respectively of the finely powdery magnesium hydroxide if the magnesium chloride solution in turn is prepared by digestion of a magnesium silicate material or magnesium hydrosilicate material, such as olivine, serpentine, garnierite and the like with hydrochloric acid and subsequent purification of the digestion pulp.

The production of the magnesium oxide in the process of the invention is effected by spray roasting of a magnesium chloride solution. By this technique a magnesium chloride solution is sprayed within a reactor, in which an atmosphere of hot gas generated by burners is present. This results in the substantially complete pyrohydrolysis of the magnesium chloride, whereas other components of the magnesium chloride solution, e.g. watersoluble potassium, sodium or calcium salts, are not modified.

It should be mentioned that also processes for preparing magnesium hydroxide and magnesium oxide different from the above mentioned spray roasting technique may be used. Thus, for the production of magnesium hydroxide and magnesium oxide from sea water lime milk or dolomite milk is added to the sea water, resulting in the precipitation of the magnesium hydroxide, the latter being separated by sedimentation and washed subsequently, whereupon the formed magnesium hydroxide is converted into the magnesium oxide by thermical treatment. Such a preparation of magnesium hydroxide and magnesium oxide is exposed to several disadvantageous influences by extraneous substances present in the sea water and in the lime milk or dolomite milk, which may result in the disadvantageous presence thereof in the end product.

Furthermore, the invention relates to the use of the finely powdery magnesium hydroxide of the invention as flame-retardant filler in plastic compounds. A preferred embodiment of the invention relates to the use of the finely powdery magnesium hydroxide of the invention as flame-retardant filler in plastic compounds, the plastic component of which being a thermoplastic substance.

Finally the invention relates to a plastic compound containing a plastic material and as flame-retardant filler a finely powdery magnesium hydroxide of the invention. A preferred plastic compound is characterized in that the compound contains as plastic component a thermoplastic material and as flame-retardant filler a finely powdery magnesium hydroxide of the invention.

In the following examples the invention is illustrated in more detail.

EXAMPLE 1

10 l of completely desalted water are added into a reaction vessel and heated to a temperature of 70° C. 850 g of a magnesium oxide having the chemical analysis and grain size analysis shown in table I, column 1, prepared by pyrohydrolysis of a magnesium-chloride solution, are introduced into the above solution and stirred sufficiently by means of a stirrer for 3 hours. Subsequent to the hydrothermical treatment the product is filtered and washed with water. After drying a product is obtained, the chemical analysis and grain size analysis of which is given in table II, column 1. The electrical conductivity of the magnesium hydroxide thus obtained was determined according to DIN 53208 on an aqueous suspension with 265 μS/cm. The primary particles have a ratio diameter to height of 3 to 4.

EXAMPLE 2

10 l of completely desalted water are added into a reaction vessel and heated to a temperature of 85° C. 2 kg of a magnesium oxide having the chemical analysis and grain size analysis shown in table I, column 2, prepared by pyrohydrolysis of a magnesium chloride solution, are stirred into the solution and subjected to a hydrothermical treatment for 5 hours. Then the product is filtered at 85° C. and washed with water. After drying a product is obtained, the chemical analysis and grain size analysis of which is given in table II, column 2. The electrical conductivity, determined according to DIN 53208 on an aqueous suspension, was 382 μS/cm. The primary particles showed a ratio of diameter to height of 5 to 6.

EXAMPLE 3

1500 g of a magnesium hydroxide prepared according to Example 1 were mixed intensively with 15 g of an alkoxysilane in a rapid mixer for 15 minutes and thereby modified in the surface.

EXAMPLE 4

For preparing a plastic compound 100 parts by weight of an elastomeric ethylene-propylene-diene-polymer (EPDM) in form of a powder were mixed intimately with 200 parts by weight of a magnesium hydroxide prepared according to Example 1. Then specimens were prepared from this plastic compound by injection molding and said specimens were examined according to DIN 53670. The results of the examination are mentioned in column A of table III.

EXAMPLE 5

Example 4 is repeated using the same polymer with the exception that a magnesium hydroxide obtained by Example 3 is employed. The results of the examination of the specimens prepared from the plastic compound are mentioned in column B of table III.

COMPARATIVE EXAMPLE 1:

Example 4 is repeated using the same polymer with the exception that a commercial magnesium hydroxide prepared from sea water is employed. The results of the examination of the specimens prepared from the plastic compound are mentioned in column C of table III.

COMPARATIVE EXAMPLE 2

Example 4 is repeated using the same polymer with the exception that a magnesium hydroxide modified on the surface, as described in DE-C3-2 659 933, is employed. The results of the examination of the specimens prepared from the plastic compound are mentioned in column C of table III.

From table III it is immediately evident that the specimens prepared from plastic compounds containing magnesium hydroxide of the invention as a filler (columns A and B) show a high tensile strength and simultaneously a good elongation at break as well as a low swelling at storage in water.

Speciments prepared from plastic compounds containing a commercial magnesium hydroxide prepared from sea water (table III, column C) show a distinctly lower tensile strength and an increased swelling at storage in water compared with the values of columns A and B of table III. The use of another known magnesium hydroxide being modified on its surface (comparative example 2, table III, column D) results in a lower swelling, but decreases highly the tensile strength.

EXAMPLE 6

For the production of a plastic compound 100 parts by weight of a polypropylene of Type PP 8400 (Hüls-Chemie) were mixed intimately with 150 parts by weight of a magnesium hydroxide obtained by Example 1. Then specimens were prepared from said plastic compound by injection molding and examined then with respect to tensile strength and elongation at break according to DIN 53455, to impact resistance according to DIN 53453, to combustion properties according to ASTM D 2863-77 and to flame resistance according to UL 94/V (3 mm). Furthermore the flow length of the plastic compound at injection molding at 240° C. was determined according to an internal comparative method as measure of processability. The obtained values are mentioned in table IV, column A. With respect to the combustion properties the LOI (limiting oxygen index) value was determined, which corresponds to the minimum amount of oxygen (% $O_2$) of the environmental atmosphere necessary to maintain the burning down. UL 94/V (3 mm) are guidelines of Underwriters Laboratory for conducting examination of flame-resistance of specimens having a thickness of 3 mm in vertical position; V-0 ... means the best result, V-1 ... a moderate result H.B. ... high burning.

EXAMPLE 7

Example 6 is repeated using the same polyproplene such as in Example 6 with the exception that a magnesium hydroxide obtained by Example 3 is employed. The results of the examination of the specimens prepared from the plastic compound by injection molding are mentioned in column B of table IV.

COMPARATIVE EXAMPLE 3

Example 6 is repeated using the same polyproplene such as in Example 6 with the exception that a commercial magnesium hydroxide prepared from sea water and used in comparative example 1 is employed. The results of the examination of the specimens prepared from the plastic compound by injection molding are mentioned in column C of table IV.

COMPARATIVE EXAMPLE 4

Example 6 is repeated using the same polyproplene such as in Example 6 with the exception that a magnesium hydroxide modified on its surface and used in comparative example 2 is employed. The results of the examination of the specimens prepared from the plastic compound by injection molding are mentioned n column D of table IV.

COMPARATIVE EXAMPLE 5

Specimens were prepared from the polypropylene used in examples 6 and 7 and the comparative examples 3 and 4 by injection molding without addition of magnesium hydroxide and subjected to the examinations mentioned in these examples and comparative examples. The results given in column E of table IV were obtained.

TABLE I

| Magnesium oxide | | 1 | 2 |
|---|---|---|---|
| Chemical analysis | | | |
| MgO (from the difference) | % by weight | 98.2 | 94.1 |
| SiO$_2$ | " | 0.005 | 0.02 |
| CaO | " | 0.50 | 0.52 |
| Al$_2$O$_3$ | " | 0.010 | 0.002 |
| Fe$_2$O$_3$ | " | 0.007 | 0.004 |
| MnO | " | 0.0005 | 0.003 |
| NiO | " | 0.003 | 0.002 |
| Na$_2$O | " | 0.02 | 0.018 |
| K$_2$O | " | 0.02 | 0.012 |
| SO$_4^{--}$ | " | 0.04 | 0.065 |
| Cl$^-$ | " | 1.2 | 5.28 |
| specific surface BET | m$^2$/g | 5.0 | 4.7 |
| Grain analysis: | | | |
| median value d$_{50}$ | μm | 2.43 | 2.68 |
| upper grain limit | μm | 24.6 | 24.6 |

TABLE II

| Magnesium hydroxide | | 1 | 2 |
|---|---|---|---|
| Chemical analysis | | | |
| loss at red heat at 1000° C./ 2 hours | % by weight | 30.5 | 30.52 |
| SiO$_2$ | " | 0.012 | 30.52 |
| Fe$_2$O$_3$ | " | 0.005 | 0.002 |
| Al$_2$O$_3$ | " | 0.003 | 0.002 |
| CaO | " | 0.006 | 0.001 |
| Mg(OH)$_2$ (from the difference) | " | 99.9 | 99.9 |
| Na$_2$O | " | <0.001 | <0.001 |
| K$_2$O | " | <0.001 | <0.001 |
| SO$_4^{--}$ | " | 0.028 | 0.017 |
| Cl$^-$ | " | 0.014 | 0.082 |
| CuO | ppm | <5 | <5 |
| MnO | " | 4 | 20 |
| NiO | " | 20 | 14 |
| specific surface BET | m$^2$/g | 11 | 14.5 |
| Grain analysis: | | | |
| median value d$_{50}$ | μm | 1.19 | 1.41 |
| upper grain limit | μm | 6.0 | 5.0 |

TABLE III

| Kind of examination | Determinations of specimens Plastic compound | | | |
|---|---|---|---|---|
| | A | B | C | D |
| Shore A-hardness DIN 53505 | 85 | 86 | 81 | 79.5 |
| Tensile strength/Nmm$^{-2}$ DIN 53504 | 7.0 10.2 | 10.0 12.8 | 4.4 6.3 | 2.8 2.8 |

TABLE III-continued

| Kind of examination | Determinations of specimens Plastic compound | | | |
|---|---|---|---|---|
| | A | B | C | D |
| original | 6.6 | 7.8 | 4.0 | 3.1 |
| 7 days at 135° C.[1] | | | | |
| 28 days storage in water 50° C.[2] | | | | |
| Elongation at break/% | 224 | 185 | 212 | 534 |
| DIN 53504 | 179 | 145 | 178 | 479 |
| original | 247 | 230 | 422 | 464 |
| 7 days at 135° C.[1] | | | | |
| 28 days storage in water 50° C.[2] | | | | |
| Swelling at storage in water/%[2] | | | | |
| Day 1 | 0.9 | 0.4 | 1.5 | 0.4 |
| Day 3 | 1.5 | 0.8 | 3.8 | 0.7 |
| Day 7 | 2.0 | 1.3 | 8.2 | 0.9 |
| Day 14 | 2.5 | 1.7 | 9.8 | 1.4 |
| Day 21 | 2.7 | 1.8 | 10.5 | 1.8 |
| Day 28 | 2.8 | 2.0 | 11.8 | 1.9 |
| vulcanization | | | | |
| minimum of torque M$_L$ | 10.0 | 9.8 | 5.4 | 2.5 |
| maximum of torque M$_H$ | 64.1 | 63.2 | 57.8 | 37.3 |

[1] Ageing by hot air was carried out in accordance with DIN 53508 by storage at 135° C. for 7 days.
[2] The storage in water was carried out in accordance with DIN 53521 by subjecting the specimens to the contacting medium water for a period of 28 days at 50° C.

TABLE IV

| Kind of examination | Plastic compound | | | | |
|---|---|---|---|---|---|
| | A | B | C | D | E |
| Tensile strength (N/mm$^2$) | 25.0 | 20.8 | 18.2 | 18.0 | 23.0 |
| Elongation at break (m/m) | 0.035 | 0.34 | 0.026 | 0.22 | >1 |
| impact resistance (KJ/m$^2$) | 10.0 | w.f. | 3.0 | w.f. | w.f. |
| LOI (% O$_2$) | 27.0 | n.d. | n.d. | 23.8 | 17.1 |
| UL 94/V (3 mm) | V-0 | V-0 | V-1 | H.B. | H.B. |
| flowing length at injection molding 240° C. (cm) | 13.5 | 14.0 | 6.0 | 15.0 | 15.0 | impact resistance w.f. = without fracture
LOI n.d. = not determined

What is claimed is:

1. A composition useful as a flame-retardant filler for plastic materials, consisting essentially of magnesium hydroxide particles having a grain size, as measured by laser diffraction, of less than 10 μm, wherein the median value of the grain size is 0.8 μm to 3 μm, and wherein Ca$^{++}$, Na$^{++}$, K$^+$, SO$_4^{--}$ and Cl$^-$ are present, and are present in an amount as follows:

Ca$^{++}$ <1000 ppm, Na$^+$ <20 ppm, K$^+$ <20 ppm,

SO$_4^{--}$ <1500 ppm, Cl$^-$ <1000 ppm, and wherein the amount of MnO, CuO and NiO is as follows:

MnO<100 ppm, Nio<100 ppm, CuO<10 ppm.

2. The composition as claimed in claim 1, wherein said magnesium hydroxide particles are coated with a surfactant.

3. The composition according to claim 1, wherein the amount of Ca$^{++}$, Na$^+$, SO$_4^{--}$ and Cl$^-$ is as follows:

Ca$^{++}$ <500 ppm, Na$^+$ <10 ppm, K$^+$ <10 ppm,

SO$_4^{--}$ <800 ppm, Cl$^-$ <500 ppm.

4. The composition according to claim 1, wherein the amount of MnO, CuO and NiO is as follows:

MnO<50 ppm, NiO<50 ppm, CuO<5 ppm.

5. The composition according to claim 1, wherein said composition has an ignition loss of greater than 30.0%.

6. The composition according to claim 1, wherein said composition has an electrical conductivity of less than 500 μS/cm.

7. The composition according to claim 6, wherein said composition has an electrical conductivity of less than 300 μS/cm.

8. The composition according to claim 1, wherein said median value of the grain size is 1±0.2 μm.

9. The composition according to claim 1, wherein said grain size is less than 7 ηm.

10. The composition according to claim 1, wherein said particles have a diameter to height ratio in the range of 2 to 6.

11. The composition according to claim 10, wherein said ratio is in the range of 3 to 4.

12. A process for preparing the composition of claim 1, comprising the steps of:

(a) adding water to magnesium oxide to form a suspension, wherein said magnesium oxide is obtained by spray roasting from a magnesium chloride solution, wherein $Ca^{++}$, $Na^+$, $K^+$, $SO_4^{--}$ and $Cl^-$ are present in the magnesium oxide and are present in the amount as follows:

$Ca^{++} < 10,000$ ppm, $Na^+ < 1,000$ ppm, $K^+ < 1,000$ ppm, $SO_4^{--} 3000$ ppm, $Cl^- < 100,000$ ppm, and wherein the amount of MnO, CuO and NiO is as follows:

MnO<150 ppm, Nio'150 ppm, CuO<15 ppm, (B) allowing the resulting suspension of step (A) to react while stirring;

(C) removing the magnesium hydroxide formed in the resulting suspension of step (B) by filtration so as to produce a filter cake material;

(D) subjecting the resulting filter cake material of step (C) to one or more post-washes with completely desalted water;

(E) dehydrating the resulting filter cake material of step (D); and (F) drying the resulting dehydrated filter cake material of step (E) so as to obtain said composition.

13. The process according to claim 12, wherein said water in step (A) is completely desalted water.

14. The process according to claim 12, wherein in step(B), said suspension is allowed to react while stirring at a temperature of between 55° and 100° C.

15. The process according to claim 14, wherein in step (B), said suspension is allowed to react while stirring at a temperature of between 80° and 90° C.

16. The process according to claim 12, wherein said magnesium chloride solution is prepared by digesting a magnesium silicate material or magnesium hydrosilicate material with hydrochloric acid so as to form a digest pulp and purifying the resulting digest pulp.

17. The process according to claim 16, wherein said magnesium silicate material or magnesium hydrosilicate material is selected from the group consisting of olivine, serpentine and garnierite.

18. The composition prepared by the process of claim 12.

19. A method for producing a flame-retardant plastic material comprising the step of adding a flame-retardant effective amount of the composition of claim 1 to a plastic material.

20. The method of claim 19, wherein said plastic material contains a thermoplastic material.

21. A plastic material containing the composition of claim 1.

22. The plastic material of claim 21, wherein said plastic material contains a thermoplastic material.

* * * * *